United States Patent
Kataoka et al.

(10) Patent No.: US 8,756,499 B1
(45) Date of Patent: Jun. 17, 2014

(54) GESTURE KEYBOARD INPUT OF NON-DICTIONARY CHARACTER STRINGS USING SUBSTITUTE SCORING

(71) Applicant: Google Inc., Mountain View, CA (US)

(72) Inventors: Satoshi Kataoka, Tokyo (JP); Keisuke Kuroyanagi, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/872,937

(22) Filed: Apr. 29, 2013

(51) Int. Cl.
*G06F 17/00* (2006.01)
(52) U.S. Cl.
USPC .......................................................... 715/259
(58) Field of Classification Search
USPC .......................................................... 715/259
See application file for complete search history.

(56) References Cited

U.S. PATENT DOCUMENTS

| | | | |
|---|---|---|---|
| 4,903,206 A * | 2/1990 | Itoh et al. ...................... 715/234 |
| 5,764,241 A * | 6/1998 | Elliott et al. .................. 345/473 |
| 5,805,911 A | 9/1998 | Miller |
| 5,829,002 A * | 10/1998 | Priest ................................... 1/1 |
| 5,923,778 A * | 7/1999 | Chen et al. .................... 382/185 |
| 5,943,674 A * | 8/1999 | Schofield ............................. 1/1 |
| 6,119,079 A * | 9/2000 | Wang et al. ........................ 704/8 |
| 6,286,064 B1 * | 9/2001 | King et al. ....................... 710/67 |
| 6,292,179 B1 | 9/2001 | Lee |
| 6,525,749 B1 * | 2/2003 | Moran et al. ................... 715/863 |
| 6,801,190 B1 | 10/2004 | Robinson et al. |
| 7,030,863 B2 | 4/2006 | Longe et al. |
| 7,035,788 B1 | 4/2006 | Nakajima et al. |
| 7,042,443 B2 | 5/2006 | Woodard et al. |
| 7,075,520 B2 * | 7/2006 | Williams ....................... 345/169 |
| 7,088,345 B2 | 8/2006 | Robinson et al. |
| 7,098,896 B2 * | 8/2006 | Kushler et al. ................. 345/168 |
| 7,145,554 B2 | 12/2006 | Bachmann |
| 7,151,530 B2 | 12/2006 | Roeber et al. |
| 7,199,786 B2 | 4/2007 | Suraqui |
| 7,250,938 B2 | 7/2007 | Kirkland et al. |
| 7,251,367 B2 | 7/2007 | Zhai |
| 7,277,088 B2 | 10/2007 | Robinson et al. |
| 7,385,591 B2 * | 6/2008 | Goodman ....................... 345/172 |
| 7,453,439 B1 * | 11/2008 | Kushler et al. ................. 345/168 |
| 7,508,324 B2 | 3/2009 | Suraqui |
| 7,634,408 B1 * | 12/2009 | Mohri ............................ 704/251 |

(Continued)

OTHER PUBLICATIONS

U.S. Appl. No. 60/430,338, by Daniel Suraqui, filed Nov. 29, 2002.

(Continued)

*Primary Examiner* — Laurie Ries
(74) *Attorney, Agent, or Firm* — Shumaker & Sieffert, P.A.

(57) ABSTRACT

In one example, a computing device may include at least one processor that outputs a graphical keyboard. The at least one processor may determine a selection of one or more keys; and determine a character string based on the one or more keys in the selection, wherein the character string is not included in a vocabulary used by the computing device to identify character strings. The at least one processor may, in response to determining that the character string is not included in the vocabulary used by the computing device to identify character strings, associate the character string with an out-of-vocabulary language model score; and determine, based at least in part on a spatial model score associated with the gesture and the out-of-vocabulary language model score, a combined score that indicates a probability that the character string corresponds to the gesture; and output for display the character string.

24 Claims, 5 Drawing Sheets

(56) References Cited

U.S. PATENT DOCUMENTS

| | | | |
|---|---|---|---|
| 7,706,616 | B2 | 4/2010 | Kristensson et al. |
| 7,716,579 | B2 | 5/2010 | Gunn et al. |
| 7,750,891 | B2 * | 7/2010 | Stephanick et al. .......... 345/173 |
| 7,895,031 | B2 | 2/2011 | Nakajima et al. |
| 7,921,361 | B2 | 4/2011 | Gunn et al. |
| 8,036,878 | B2 | 10/2011 | Assadollahi |
| 8,077,983 | B2 * | 12/2011 | Qiu et al. ...................... 382/229 |
| 8,135,582 | B2 | 3/2012 | Suraqui |
| 8,423,916 | B2 * | 4/2013 | Chihara et al. ................ 715/863 |
| 2006/0119582 | A1 | 6/2006 | Ng et al. |
| 2006/0129397 | A1 * | 6/2006 | Li et al. ......................... 704/245 |
| 2006/0176283 | A1 | 8/2006 | Suraqui |
| 2007/0074131 | A1 * | 3/2007 | Assadollahi .................. 715/816 |
| 2008/0316183 | A1 | 12/2008 | Westerman et al. |
| 2009/0099841 | A1 * | 4/2009 | Chen ................................. 704/9 |
| 2010/0020025 | A1 * | 1/2010 | Lemort et al. ................ 345/173 |
| 2010/0153880 | A1 * | 6/2010 | Dinn ............................. 715/816 |
| 2011/0071834 | A1 * | 3/2011 | Kristensson et al. ......... 704/251 |
| 2011/0208507 | A1 | 8/2011 | Hughes |
| 2011/0320978 | A1 * | 12/2011 | Horodezky et al. ........... 715/823 |
| 2012/0029910 | A1 | 2/2012 | Medlock et al. |
| 2012/0036469 | A1 | 2/2012 | Suraqui |
| 2012/0324391 | A1 * | 12/2012 | Tocci ............................. 715/773 |
| 2013/0046544 | A1 * | 2/2013 | Kay et al. ...................... 704/275 |
| 2013/0173611 | A1 * | 7/2013 | Wald et al. .................... 707/730 |

OTHER PUBLICATIONS

U.S. Appl. No. 60/505,724, by Daniel Suraqui, filed Sep. 22, 2003.

Natasha Lomas, "Hey Apple, What the Next iPhone Really, Really Needs Is a Much Better Keyboard," http://techcrunch.com/2013/04/21/the-iphone-keyboard-stinks/?, Apr. 21, 2013, 6 pgs.

Goodman, et al. "Language Modeling for Soft Keyboards", American Association for Artificial Intelligence, 2002, 6 pps.

Goodman, et al. "Lanuage Modeling for Soft Keyboards", IUI'02, Jan. 13-16, 2002, 2 pps.

Nakov, "Combing Word-Level and Character-Level Models for Machine Translation Between Closely-Related Lanuages", Proceedings of the 50th Annual Meeting of the Association for Computational Linguistics, Jul. 8-14, 2012, pp. 301-305.

U.S. Appl. No. 13/774,656, by Yu Ouyang et al., filed Feb. 22, 2013.

U.S. Appl. No. 13/865,977, by Satoshi Kataokaet al., filed Apr. 18, 2013.

* cited by examiner

GESTURE KEYBOARD INPUT OF NON-DICTIONARY CHARACTER STRINGS USING SUBSTITUTE SCORING

BACKGROUND

Some computing devices (e.g., mobile phones, tablet computers, etc.) may provide a graphical keyboard as part of a graphical user interface for composing text using a presence-sensitive input device (e.g., a presence-sensitive display, such as a presence-aware and/or touch screen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a continuous-gesture graphical keyboard (sometimes referred to as a "combo gesture keyboard," or "gesture keyboard") with which the user can interact by inputting a continuous gesture that indicates a character string to be input to the computing device (e.g., by sliding his or her finger over various regions of the presence-sensitive display associated with desired keys of the keyboard). In this way, continuous-gesture graphical keyboards allow a user to enter a character string or group of character strings with a single gesture. As such, a continuous-gesture graphical keyboard may allow the user to achieve a certain degree of input efficiency.

In some examples, a computing device that provides a gesture keyboard may rely on word prediction, auto-correction, and/or suggestion techniques for determining a word from a gesture input. These techniques may speed up text entry and minimize spelling mistakes of character strings included in a predetermined vocabulary (e.g., a dictionary). One or more of the techniques may have certain drawbacks, however. For instance, in some examples, a computing device that provides a gesture keyboard and relies on one or more of the techniques may not correctly determine out-of-vocabulary character strings (e.g., words not included in a dictionary) from gesture input entered at the presence-sensitive screen. As such, a user may need to perform additional effort to enter non-dictionary character strings (e.g., names, slang, abbreviations, acronyms, and the like) using gesture input.

SUMMARY

In one example, a method includes outputting, by a computing device and for display, a graphical keyboard comprising a plurality of keys. The method may also include responsive to receiving an indication of a gesture detected at a presence-sensitive input device, determining, by the computing device, a selection of one or more of the plurality of keys. The method may also include determining, by the computing device, a character string based on the one or more of the plurality of keys in the selection, wherein the character string is not included in a vocabulary used by the computing device to identify character strings. The method may also include, in response to determining that the character string is not included in the vocabulary used by the computing device to identify character strings, associating, by the computing device, the character string with an out-of-vocabulary language model score. The method may also include determining, by the computing device and based at least in part on a spatial model score associated with the gesture and the out-of-vocabulary language model score, a combined score that indicates a probability that the character string corresponds to the gesture. The method may also include outputting, by the computing device and for display, the character string.

In one example, a computer-readable storage medium is encoded with instructions that, when executed, cause at least one processor to output for display, a graphical keyboard comprising a plurality of keys. The computer-readable storage medium may be encoded with instructions that, when executed, cause at least one processor to, responsive to receiving an indication of a gesture detected at a presence-sensitive input device, determine a selection of one or more of the plurality of keys. The computer-readable storage medium may be encoded with instructions that, when executed, cause at least one processor to determine a character string based on the one or more of the plurality of keys in the selection, wherein the character string is not included in a vocabulary used by the computing device to identify character strings. The computer-readable storage medium may be encoded with instructions that, when executed, cause at least one processor to, in response to determining that the character string is not included in the vocabulary used by the computing device to identify character strings, associate the character string with an out-of-vocabulary language model score. The computer-readable storage medium may be encoded with instructions that, when executed, cause at least one processor to determine, based at least in part on a spatial model score associated with the gesture and the out-of-vocabulary language model score, a combined score that indicates a probability that the character string corresponds to the gesture. The computer-readable storage medium may be encoded with instructions that, when executed, cause at least one processor to output for display the character string.

In one example, a computing device may include at least one processor, wherein the at least one processor is configured to: output for display, a graphical keyboard comprising a plurality of keys. The at least one processor may be configured to responsive to receiving an indication of a gesture detected at a presence-sensitive input device, determine a selection of one or more of the plurality of keys. The at least one processor may be configured to determine a character string based on the one or more of the plurality of keys in the selection, wherein the character string is not included in a vocabulary used by the computing device to identify character strings. The at least one processor may be configured to in response to determining that the character string is not included in the vocabulary used by the computing device to identify character strings, associate the character string with an out-of-vocabulary language model score. The at least one processor may be configured to determine, based at least in part on a spatial model score associated with the gesture and the out-of-vocabulary language model score, a combined score that indicates a probability that the character string corresponds to the gesture. The at least one processor may be configured to output for display the character string.

The details of one or more examples are set forth in the accompanying drawings and the description below. Other features, objects, and advantages of the disclosure will be apparent from the description and drawings, and from the claims.

DETAILED DESCRIPTION

Figure 1:
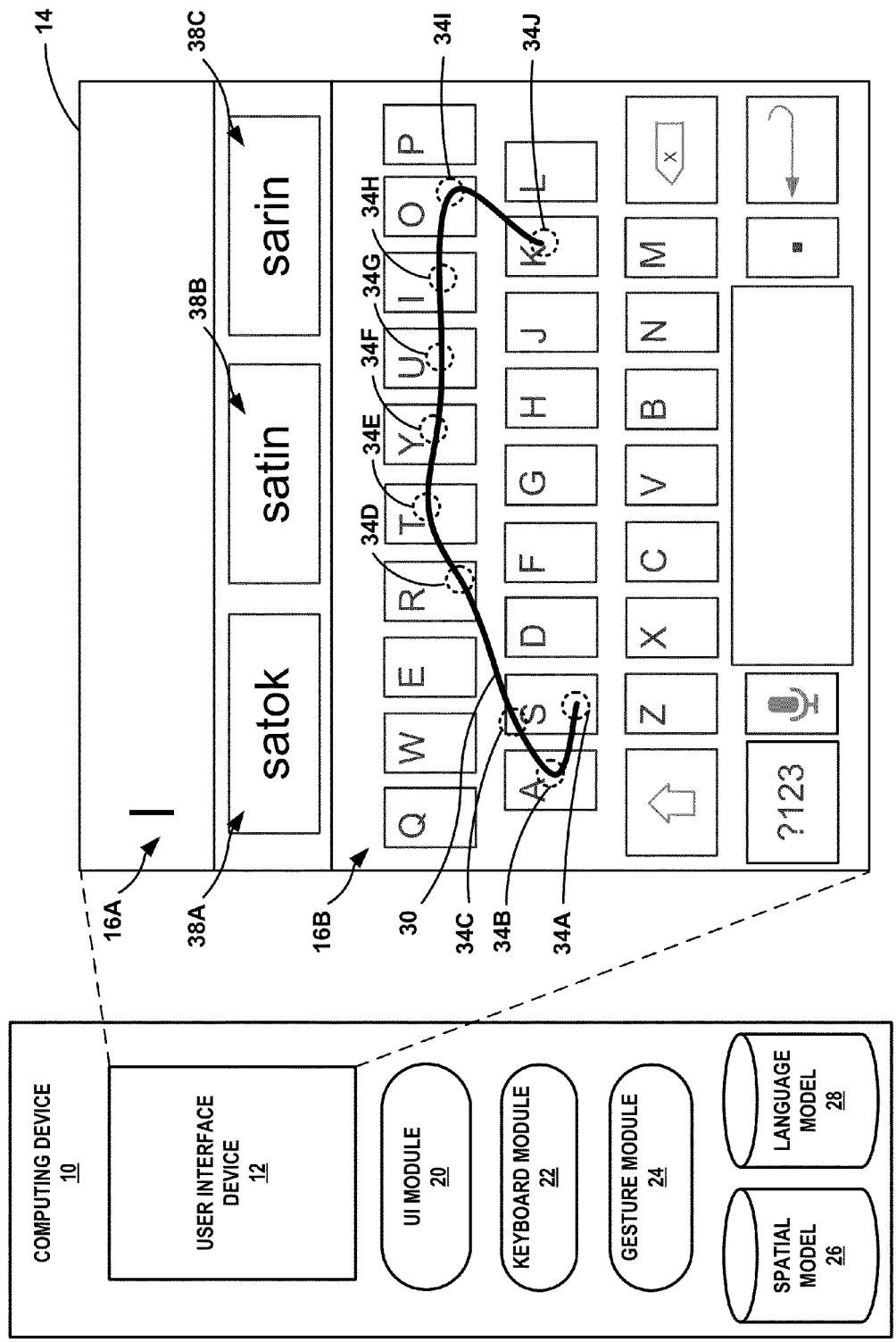
FIG. 1 is a conceptual diagram illustrating an example computing device that is configured to determine an out-of-vocabulary character string with a gesture keyboard, in accordance with one or more aspects of the present disclosure.

In general, this disclosure is directed to techniques for determining one or more out-of-vocabulary (OOV) (e.g., out-of-dictionary) character strings based on a detected gesture to select one or more keys of a graphical keyboard. In some examples, a computing device that outputs a graphical keyboard at, for example, a presence-sensitive screen, may also receive indications of gestures detected at the presence-sensitive screen. For instance, a continuous (e.g., non-tap) gesture that traverses locations associated with multiple keys presented by the presence-sensitive screen may indicate a selection of multiple keys. As another example, a non-continuous (e.g., tap) gesture may indicate a selection of an individual key. In certain examples, the computing device may receive input associated with one or more gestures at or near the presence-sensitive screen that is indicative of a string of text, e.g., a character string in a dictionary or an OOV character string.

The techniques described may improve accuracy with which a computing device detects a selection of keys intended to generate and output an OOV character string, e.g., a character string not currently within one or more dictionaries or language models based on the one or more dictionaries. For instance, when a user provides a gesture to input an OOV character string, some computing devices that implement gesture-based keyboards may not identify the OOV character string and refrain from outputting the OOV character string. In other examples, such computing devices may autocorrect the OOV character string that was actually intended by the user to a different character string in a dictionary that the user did not intend to input, thereby requiring the user to further revise the autocorrected character string. Because such computing devices may rely exclusively on a predefined set of character strings in a dictionary to predict and/or autocorrect inputted character strings, the computing device may not output or autocorrect the OOV character string if the OOV character string inputted by the user does not exist in the dictionary. In accordance with techniques of the present disclosure, rather than discarding and/or autocorrecting character strings inputted by a user that constitute OOV character strings (e.g., are not in the dictionary), techniques of the disclosure may by applied by the computing device to output such OOV character strings.

In one example, using techniques of the disclosure, a computing device initially determines a plurality of keys of a graphical keyboard based on an indication of a gesture detected at a presence-sensitive display. The computing device may determine whether to output a character string corresponding to the indication of the gesture based on a spatial model score and a language model score. For instance, the computing device may determine spatial model scores for one or more keys based at least in part on locations of a presence-sensitive screen traversed by the gesture. The spatial model scores may indicate respective probabilities of each the keys based at least in part on locations of a presence-sensitive screen traversed by the gesture. The language model score may indicate the probability of the character string based at least in part on a language context, which may include character strings in a dictionary and/or previously inputted character strings temporally proximate to the current gesture. Rather than autocorrecting or refraining from outputting a character string if the computing device determines that the dictionary does not include the character string, the computing device may further determine an out-of-dictionary language model score that may be associated with the character string not included in the dictionary. Consequently, the computing device may determine a combined score based on the out-of-dictionary language model score and the spatial model score. If the computing device determines that the combined score satisfies the threshold, the computing device may output the character string, e.g., the OOV character string, for display. In this way, the computing device, using an out-of-dictionary language model score for character string not included in a dictionary, may—consistent with user intent—output an OOV character string for display.

Techniques of this disclosure may therefore enable a computing device to determine an OOV character string, while improving and/or maintaining the speed and ease that single continuous gesture inputs and gesture-based graphical keyboards provide to the user. As such, the techniques described in this disclosure may improve the speed with which a user can type an OOV character string at a graphical keyboard. The techniques may reduce or prevent the computing device from erroneously auto-correcting or erroneously predicting a character string from a gesture input. In this way, the techniques may reduce and/or eliminate the need for the user to correct an auto-corrected or predicted character string when entering an OOV character string. Consequently, the computing device may receive fewer inputs from a user to manually correct these mistakes and thereby reduce user effort to input character strings. A computing device that receives fewer inputs may, in some examples, perform fewer operations and as such consume less electrical power.

FIG. 1 is a conceptual diagram illustrating an example computing device that is configured to determine an out-of-vocabulary character string with a gesture keyboard, in accordance with one or more aspects of the present disclosure. In the example of FIG. 1, computing device 10 may be a mobile phone. However, in other examples, computing device 10 may be a tablet computer, a personal digital assistant (PDA), a laptop computer, a portable gaming device, a portable media player, an e-book reader, a watch, television platform, or another type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen that may receive tactile user input from a user of computing device 10. UID 12 may receive indications of the tactile user input by detecting one or more tap and/or non-tap gestures from a user of computing device 10 (e.g., the user touching or pointing to one or more locations of UID 12 with a finger or a stylus pen). The presence-sensitive screen of UID 12 may present output to a user. UID 12 may present the output as a user interface (e.g., user interface 14) which may be related to functionality provided by computing device 10. For example, UID 12 may present various user interfaces of applications (e.g., an electronic message application, an Internet browser application, etc.) executing at computing device 10. A user of computing device 10 may interact with one or more of these applications to perform a function with computing device 10 through the respective user interface of each application.

Computing device 10 may include user interface ("UI") module 20, keyboard module 22, and gesture module 24. Modules 20, 22, and 24 may perform operations described using software, hardware, firmware, or a mixture of both hardware, software, and firmware residing in and executing on computing device 10. Computing device 10 may execute modules 20, 22, and 24, with multiple processors. Computing device 10 may execute modules 20, 22, and 24 as a virtual machine executing on underlying hardware. Modules 20, 22, and 24 may be implemented in various ways. For example, UI module 20 may be implemented as a downloadable or pre-installed application or "app." In another example, UI module 20 may be implemented as part of an operating system of computing device 10.

Gesture module 24 of computing device 10 may receive from UID 12, one or more indications of user input detected at the presence-sensitive screen of UID 12. Generally, each time UID 12 receives an indication of user input detected at a location of the presence-sensitive screen, gesture module 24 may receive information about the user input from UID 12. Gesture module 24 may assemble the information received from UID 12 into a time-ordered set of events indicative of a gesture, such as a sequence of touch events. Each touch event in the sequence may include data or components that represents parameters (e.g., when, where, originating direction) characterizing a presence and/or movement of input at the presence-sensitive screen. Each touch event in the sequence may include a location component corresponding to a location of UID 12, a time component related to when UID 12 detected user input at the location, and an action component related to whether the touch event corresponds to a lift up or a push down at the location. Moreover, one or more of the events may have a concurrent time component, and such events are described as touch events merely for purposes of example and may be indicative of a gesture at any form of presence-sensitive input device.

Gesture module 24 may determine one or more characteristics of the user input based on the sequence of touch events and include information about these one or more characteristics within each touch event in the sequence of touch events. For example, gesture module 24 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.). Gesture module 24 may transmit, as output to keyboard module 22, the sequence of touch events including the components or parameterized data associated with each touch event.

In the example of FIG. 1, UI module 20 may cause UID 12 to present example user interface 14. In this example, user interface 14 includes graphical elements displayed at various locations of UID 12. FIG. 1 illustrates edit region 16A of user interface 14, and graphical keyboard 16B of user interface 14. Edit region 16A may include graphical elements such as images, objects, hyperlinks, characters of text, etc. Graphical keyboard 16B includes graphical elements displayed as keys. User interface 14 includes suggested character string regions 38A-38C that include selectable spelling corrections or character string suggestions to replace character strings that are included in edit region 16A. In the example of FIG. 1, edit region 16A includes graphical elements displayed as characters of text (e.g., a character string). A user of computing device 10 may enter text in edit region 16A by providing user input at locations of UID 12 that display the keys of graphical keyboard 16B. In response to user input such as this, computing device 10 may output one or more suggested character strings in suggested character string regions 38A-38C.

UI module 20 may act as an intermediary between various components of computing device 10 to make determinations based on input detected by UID 12 and generate output presented by UID 12. For instance, UI module 20 may receive, as an input from keyboard module 22, a representation of a keyboard layout of the keys included in graphical keyboard 16B. UI module 20 may receive, as an input from gesture module 24, a sequence of touch events generated from information about user input detected by UID 12. UI module 20 may determine, based on the location components in the sequence touch events, that one or more location components approximate a selection of one or more keys (e.g., UI module 20 may determine the location of one or more of the touch events corresponds to an area of UID 12 that presents graphical keyboard 16B). Gesture module 24 may transmit, as output to keyboard module 22, the sequence of touch events along with locations where UID 12 presents each of the keys. In response, UI module 20 may receive, from keyboard module 22, one or more suggested character strings. UI module 20 may update user interface 14 to include the one or more character strings within edit region 16A and/or character string regions 38A-38C. UI module 20 may cause UID 12 to present the updated user interface 14.

Keyboard module 22 of computing device 10 may transmit, as output to UI module 20 (for inclusion as graphical keyboard 16B of user interface 14) a keyboard layout including a plurality of keys related to one or more written languages (e.g., English, Spanish, etc.). Keyboard module 22 may assign one or more characters or operations to each key of the plurality of keys in the keyboard layout. For instance, keyboard module 22 may generate a QWERTY keyboard layout including keys that represent characters used in typing the English language. The QWERTY keyboard layout may also include keys that represent operations used in typing the English language (e.g., backspace, delete, spacebar, enter, etc.).

Keyboard module 22 may receive data from gesture module 24 that represents the sequence of touch events generated by gesture module 24. Keyboard module 22 may also receive data from gesture module 24 that represents locations of the presence-sensitive screen of UID 12 where UID 12 presents each of the keys of graphical keyboard 16B. Keyboard module 22 may determine, based on the locations of the keys, that the sequence of touch events represents a selection of one or more keys. Keyboard module 22 may determine one or more character strings based on the selection where each character in the character string corresponds a key of the graphical keyboard, in accordance with techniques of this disclosure. Keyboard module 22 may send data indicating one or more character strings to UI module 20 for inclusion in edit region 16A of user interface 14.

To determine the sequence of touch events represents a selection of one or more keys, keyboard module 22 may include a spatial model 26. In general, spatial model 26 may generate one or more probabilities that a particular key of a graphical keyboard has been selected based on location data associated with a user input. In some examples, spatial model 26 includes a bivariate Gaussian model for each key. The bivariate Gaussian model for a key may include a distribution of coordinates (e.g., (x,y) coordinate pairs) that correspond to locations of UID 12 that present the given key. More specifically, in some examples, a bivariate Gaussian model for a key may include a distribution of coordinates that correspond to locations of UID 12 that are most frequently selected by a user when the user intends to select the given key. The shorter the distance between location data of a user input and a higher density area of spatial model 26, the higher the probability that the key associated with spatial model 26 has been selected. A greater distance between location data of a user input and a higher density area of spatial model 26, the lower the probability that the key associated with spatial model 26 has been selected.

Keyboard module 22 may use spatial model 26 to compare the location components (e.g., coordinates) of one or more touch events in the sequence of touch events to respective locations of one or more keys of graphical keyboard 16B and generate a probability based on these comparisons that a selection of a key occurred. In some examples, keyboard module 22 may generate a spatial model score using spatial model 26. The spatial model score may indicate a probability of a selected key based at least in part on locations of UID 12 traversed by a gesture. In some examples, a spatial model score may indicate a combined probability of a group of selected keys based at least in part on locations of UID 12 traversed by a gesture.

For example, keyboard module 22 may use spatial model 26 to compare the location component of one or more touch event in the sequence of touch events to a key location of a particular key of graphical keyboard 16B. The location component of each touch event in the sequence may include one location of UID 12. A key location (e.g., a centroid of a key) of a key in graphical keyboard 16B may include a different location of UID 12. Keyboard module 22 may use spatial model 26 to determine a Euclidian distance between the two locations and generate a probability based on the Euclidian distance that the key was selected. Spatial model 26 may indicate a higher probability for a key that shares a smaller Euclidian distance with one or more touch events than a key that shares a greater Euclidian distance with one or more touch events. Based on the spatial model probability associated with each key, keyboard module 22 may assemble the individual key selections with the highest spatial model probabilities into a time-ordered sequence of keys that keyboard module 22 may then determine represents a character string. The combined probabilities of each key may represent a spatial model score for the character string.

Keyboard module 22 may use a language model 28 to determine language model scores for one or more characters strings based on the sequence of keys corresponding to touch events. For example, each key of the keyboard may represent a character or a keyboard operation. Keyboard module 22 may determine, based on the sequence of keys, particular characters represented by one or more key selections. A character such as a number or a lowercase letter may require a single character key selection (e.g., <letter-key>, <number-key>, etc.) and a character such as a capitalized letter may require two key selections (e.g., <shift-key>+<letter-key>, etc.).

Keyboard module 22 may access language model 28 of computing device 10 to determine language model scores for a group of one or more character strings based on sequences of keys corresponding to a gesture. That is, keyboard module 22 may incrementally generate a group of one or more character strings using language model 28 in response to receiving indications of one or more gestures. A character string may be a group of characters comprising a prefix or portion of a character string included in language model 28 or an OOV character string. In some examples, a character string may be a group of characters comprising a complete character string included in language model 28 or a complete OOV character string. As keyboard module 22 receives indications of one or more gestures, keyboard module 22 may incrementally determine spatial and language model scores corresponding to character strings. Using the spatial and language model scores, keyboard module 22 may determine a combined score for each character string based on the spatial and language model score for each respective character string. Keyboard module 22 may update the spatial, language, and/or combined scores incrementally as keyboard module 22 determines subsequent indications of gestures. For instance, keyboard module 22 may, while receiving a plurality of indications of one or more gestures detected at a presence-sensitive screen, update the out-of-vocabulary language model score based on a language context, wherein the language context changes in response to at least one the plurality of indications of one or more gestures. For instance, the language model scores associated with character strings in language model 28 may change in response to character strings that are inputted. Since the out-of-vocabulary language model score may be based on a language model score included in language model 28, keyboard module 22 may update the out-of-vocabulary language model score based on the changing language context. Because the combined score may indicate a probability that a character string corresponds to a gesture, keyboard module 22 may rank the character strings by their respective combined scores as further described in this disclosure. Keyboard module 22 may then output the character strings and/or determine other character strings based on the character strings for output.

Generally, language model 28 of computing device 10 may include a list of character strings, e.g., words, within a written language vocabulary. In some examples, language model 28 may be based on and/or include a set of character strings based on a dictionary (e.g., that includes a vocabulary of words) stored at computing device 10 or a remote computing device that is accessible by computing device 10. In some examples, the dictionary may include a vocabulary of words. A vocabulary of words may be a body of words used in a written and/or spoken language. A dictionary may be implemented as a data structure that stores one or more words of a vocabulary in a structured manner. Language model 28 may indicate a probability of each respective character string based on the frequency with which the character string occurs in a given language context. For instance, the character string "door" may be more frequently used in the English language following the character string "the" and therefore associated with a larger probability than, for example, the character string "run" following the character string "the."

Keyboard module 22 may perform a lookup in language model 28 to identify one or more character strings, e.g., words in language model 28, that include a part of or all of a group of characters associated with keys corresponding to a gesture. Language model 28 may implement one or more n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(n-1)}, \ldots, x_{i-1})$). For instance, a character-level bigram language model (an n-gram model where n=2), may provide a probability that the letter "w" follows the sequence of letters "no". In another example, a word-level trigram language model may provide a probability that "fox" follows the word sequence "the quick brown."

Keyboard module 22 may use language model 28 to determine a language model score for a character string based on a language context that may include, but is not limited to, e.g., a character corresponding to indication of the gesture performed by the user, character strings in a dictionary and/or previously inputted character strings, etc. For example, keyboard model 22 may determine a group of characters associated with keys corresponding to a gesture. The group of characters may be a prefix or portion of a character string. The character string may be included in language model 28 or may be an out-of-vocabulary character string. Keyboard module 22 may search or "look ahead" to determine one or more character strings in language model 28 that correspond respectively to the prefix. For instance, given a character string s-a-t, keyboard module 22 may determine, using language model 28 the probability of a character string satin. Keyboard module 22 may determine a language model score based on the probability. In this way, character strings in language model 28 having higher probabilities in a given language context may have higher language model scores.

In some examples, keyboard module 22 may perform a lookup of multiple different groups of characters associated with keys corresponding to a gesture, for example, where each group of characters may be a prefix or portion of a character string. Keyboard module 22 may use language model 28 to identify one or more character strings in language model 28 that include a part of or all of the characters of the group of characters that may be a prefix or portion of the character string. As shown in FIG. 1, a user may perform a gesture 30 at UID 12 that traverses the keys s-a-r-t. Keyboard module 22 may therefore perform a lookup of prefix s-a-r to determine a group of character strings that begin with s-a-r. Similarly, keyboard module 22 may perform a lookup of prefix s-a-t to determine a group of character strings that begin with s-a-t.

In some examples, keyboard module 22 determines a combined score for each character string based at least in part on the respective spatial and language module scores for each respective character string. The combined probability for a character string may therefore represent the probability of the character string based on a language context and the accuracy of a gesture given a set of keys. Keyboard module 22 may order each character string in a group of character strings by combined score in descending order from most probable character string to least probable character string. In some examples, keyboard module 22 may determine one or more character strings based on the one or more character string with the highest probabilities. UID 12 may output such character strings as suggested character strings in suggested character string regions 38A-38C. In other examples, one or more candidate character strings with the highest probabilities may be output at edit region 16A.

Rather than autocorrecting or refraining from outputting a character string if computing device 10 determines that language model 28 does not include the character string, computing device 10 may determine an out-of-vocabulary language model score that may be associated with the character string (e.g., an OOV character string) not included in language model 28. That is, although a out-of-vocabulary character string may not be included in language model 28 (and therefore no language model score for the out of-vocabulary character string may be available from language model 28), keyboard module 22 may determine an out-of-vocabulary language model score to associate with the out-of-vocabulary character string. Consequently, computing device 10 may determine a combined score based on the out-of-vocabulary language model score and the spatial model score. In this way, computing device 10, using an out-of-vocabulary language model score for character string not included in a dictionary, may still output OOV character strings for display although such out-of-vocabulary character string may not be included in language model 28.

For exemplary purposes, the techniques are further described in detail with reference to FIG. 1. In the example of FIG. 1, computing device 10 outputs for display graphical keyboard 16B comprising a plurality of keys. For example, keyboard module 22 may generate data that includes a representation of graphical keyboard 16B. UI module 20 may generate user interface 14 and include graphical keyboard 16B in user interface 14 based on the data representing graphical keyboard 16B. UI module 20 may send information to UID 12 that includes instructions for displaying user interface 14 at a presence-sensitive screen of UID 12. UID 12 may receive the information and cause the presence-sensitive screen of UID 12 to present user interface 14 including edit region 16A, graphical keyboard 16B, and suggested character string regions 38A-38C. Graphical keyboard 16B may include a plurality of keys.

Computing device 10 may, responsive to receiving an indication of gesture 30 detected at a presence-sensitive display of UID 12, determine a selection of one or more of the plurality of keys. For example, as UID 12 presents user interface 14 at the presence-sensitive screen, a user may provide gesture user input 30 (or simply "gesture" 30) at a location of the presence-sensitive screen where UID 12 presents graphical keyboard 16B. FIG. 1 illustrates a path of gesture 30 including portions 34A-34J of the path of gesture 30 (collectively "portions" 34) that each represent a portion or subsection of the path of gesture 30. For example, portion 34A represents a beginning portion of gesture 30, portion 34J represents an ending portion of gesture 30, and portions 34B-34I each represent mid-portions of gesture 30. Each of portions 34 are delimited by dashed circles in FIG. 1 for example purposes, although UID 12 may not output such dashed circles in some examples, and such portions may be larger and/or smaller in various different examples.

Gesture module 24 may receive information indicating gesture 30 from UID 12 and assemble the information into a time-ordered sequence of touch events (e.g., each touch event including a location component, a time component, and an action component). Gesture module 24 may send the touch events to keyboard module 22. Keyboard module 22 may receive the sequence of touch events along with the information associated with each touch event (e.g., location, time, action, etc.) from UI module 20. Keyboard module 22 may compare the location component of each touch event in the sequence of touch events to each key location to determine one or more keys that share the same approximate locations of UID 12 as the locations of touch events in the sequence of touch events. For example, keyboard module 22 may use spatial model 26 to determine a spatial model score that indicate a probability that one or more touch events corresponds to a selection of a key.

Keyboard module 22 may determine a character string based on the one or more characters from the plurality of keys. For example, keyboard module 22 may determine the sequence of keys represents the character string satok based on a sequential selection of the <S-key>, <A-key>, <T-key>, <O-key>, and <K-key> of graphical keyboard 16B. In some examples, keyboard module 22 may determine other possible character strings, such as sartik, satyok, etc. Taking satok as an example, keyboard module 22 may use language model 28 to determine a character string based on the group of characters s-a-t-o-k corresponding to the selection of keys indicated by the gesture. Similarly, keyboard module 22 may also use language model 28 to determine one or more character strings based on the groups of characters s-a-t-i-n-g and s-a-r-i-n corresponding, respectively, to selections of different groups of possible keys indicated by the gesture.

In some examples, keyboard module 22 may determine that one or more of the character strings are not included in a dictionary used by computing device 10 to identify character strings. That is, in some examples, language model 28 may model and/or include character strings of one or more dictionaries, and keyboard module 22 may determine whether a character string comprising a group of characters corresponding to a selection of keys indicated by a gesture is not included in language model 28 and therefore is not in a dictionary (e.g., that includes a vocabulary of words). For instance, for instance, keyboard module 22 may determine that satok is not included in language model 28. The character string satok may therefore be determined to be an out-of-vocabulary (OOV) character string. Keyboard module 22 may, however, determine that "satin" and "sarin" are character strings included in language model 28. The character strings "satin" and "sarin" share the same prefix sa as satok and are associated with similar gesture paths. Keyboard module 22 may therefore determine language model scores for "satin" and "sarin" that indicate the respective probabilities of the character strings given a language context that includes the inputted character string satok. As described above, keyboard module 22 may also determine a spatial model scores for "satin" and "sarin" that indicate the respective probabilities of these character strings given the keys traversed by gesture 30.

In accordance with techniques of the disclosure, rather than discarding satok because language model 28 does not include satok, keyboard module 22 may associate the character string satok with an out-of-vocabulary language model score. An out-of-vocabulary language model score may represent a substitute language model score for a character string that is not included in language model 28, which may include character strings from one or more dictionaries. In some examples, an out-of-vocabulary language model score may be a predetermined value. In other examples, keyboard module 22 may determine the out-of-vocabulary language model score based at least in part on a probability of the least-probable character string in language model 28. For instance, as further illustrated in FIG. 4, each character string in language model 28 may be associated with a value indicating the probability of the character string in a given context. Keyboard module 22 may determine the out-of-vocabulary language model score to be the language model score of the least-probable character string in language model 28. In any case, keyboard module 22 may associate the character string satok with the out-of-vocabulary language model score. Additionally, keyboard module 22 may determine, as described above, a spatial model score for satok based on the keys s-a-t-o-k and gesture 30.

Keyboard module 22 may determine combined scores for one or more of the character strings, which may include the character string satok (e.g., an OOV character string). Keyboard module 22 may determine a combined score for each character string based on the respective spatial and language model scores the character string. The combined score may indicate a probability that the character string corresponds to the gesture. In some examples, keyboard module 22 may output one or more character string suggestions (e.g., candidate and/or OOV character strings) in character string suggestion regions 38A-38C. For instance, as shown in FIG. 1, the three character strings with the highest combined scores may be output for display in suggested character string regions 38A-38C. In the example of FIG. 1, the combined score associated with the character string satok may be the highest combined score. The out-of-vocabulary language model score may be low for satok, but the spatial model score associated with satok may be high relative to spatial model scores of other candidate character strings because gesture path 30 traverses the s-a-t-o-k keys more precisely due to the user intending to enter the OOV character string satok. Consequently, the combined score for satok may remain one of the highest combined scores among the candidate character strings. Therefore, keyboard module 22 may output the OOV character string satok for display in character string suggestion region 38A as one of the three character strings having the highest combined scores among the candidate character strings determined by keyboard module 22.

Keyboard module 22 may output the one or more candidate character strings or phrases and associated rankings to UI module 20 for inclusion either in edit region 16A of user interface 14, or as individual suggested character strings 38 in suggested character string regions 38A-38C of user interface 14. UI module 20 may receive the one or more candidate character strings or phrases (including the raw character string) from keyboard module 22 along with a rank of the one or more candidate character strings or phrases. UI module 20 may update suggested character string regions 38A-38C by including the three highest ranking candidate character strings as suggested character strings. As illustrated in FIG. 1, in the event that the user intended to input an OOV character string or phrase with gesture 30, UI module 20 may include the raw character string, e.g., the OOV character string, as illustrated with character string suggestion region 38A. From user interface 14, the user can select one of suggested character strings 38 by tapping or providing an input at a location of UID 12 where UID 12 outputs suggested character string regions 38A-38C. For example, the user tap over the location of UID 12 where UID 12 presents a suggested character string, e.g., satok. Tapping over suggested character string region 38A may cause UI module 20 to update user interface 14 and include the OOV character string satok in edit region 16A.

In this way, the techniques of the disclosure may enable a computing device to receive OOV character strings or phrases based on a gesture input entered at a graphical keyboard. The techniques of the disclosure may enable a computing device to more accurately determine a character string and output an OOV character string. The techniques may further enable a user to more quickly enter character strings at a computing device since the user may provide fewer inputs to correct the computing device or individually tapping at keys to enter OOV character strings. A computing device such as this may process fewer user inputs, execute fewer operations, and as a result, consume less electrical power.

Figure 2:
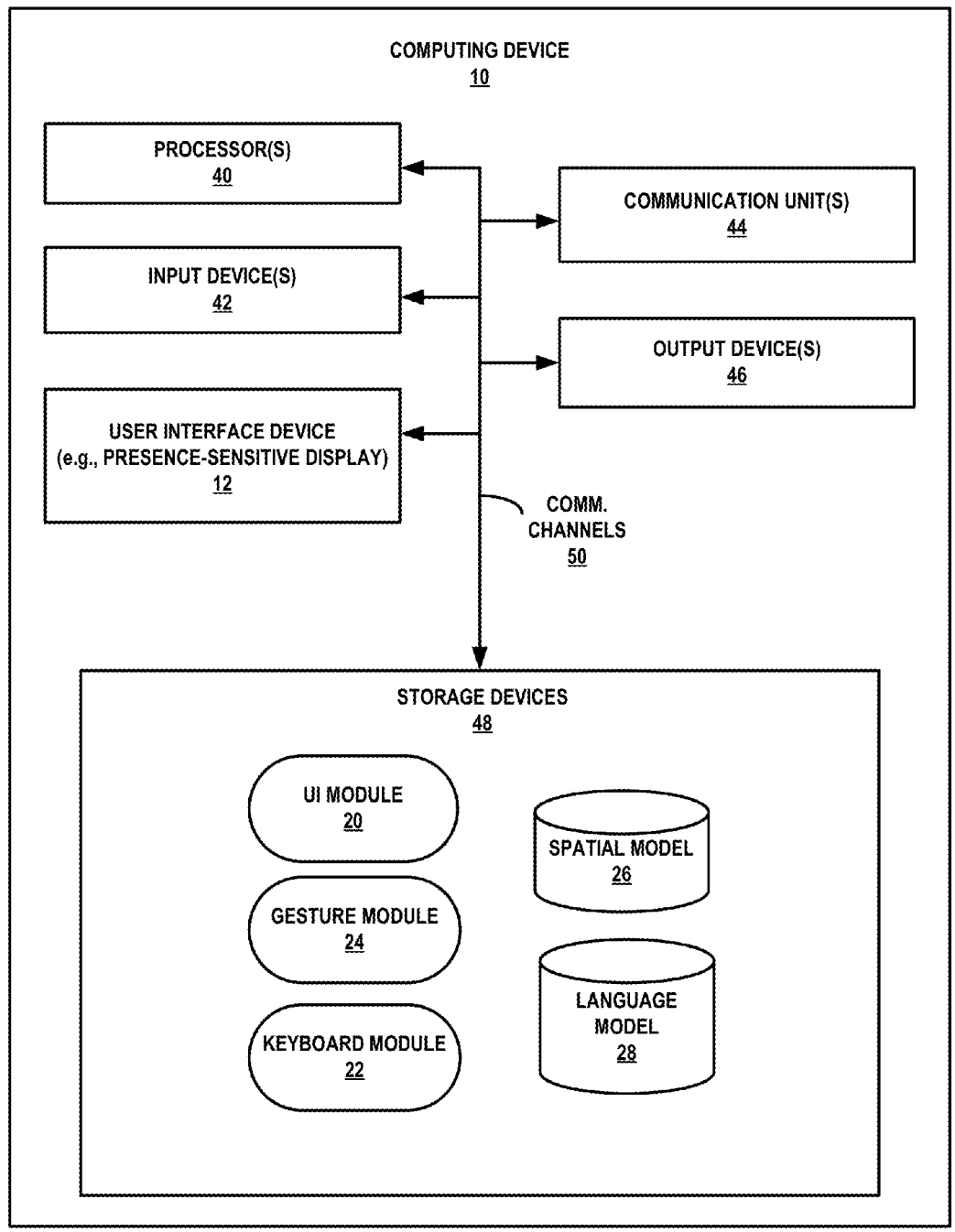
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user-interface device 12 (e.g., a presence-sensitive display), one or more processors 40, one or more input devices 42, one or more communication units 44, one or more output devices 46, and one or more storage devices 48. Storage devices 48 of computing device 10 also include UI module 20, keyboard module 22, gesture module 24, spatial model 26 and language module 28. Communication channels 50 may interconnect each of the components 12, 40, 42, 44, 46, 48, 20, 22, 24, 26, and 28, for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a mouse, keyboard, voice responsive system, video camera, microphone or any other type of device for detecting input from a human or machine. In some examples, input device 42 may be a presence-sensitive input device, which may include presence-sensitive screen, touch-sensitive screen, etc.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), or any other type of device for generating visual output.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, UID 12 of computing device 10 may include functionality of input devices 42 and/or output devices 46. In the example of FIG. 2, UID 12 may be or may include a presence-sensitive input device, such as a presence-sensitive screen, touch-sensitive screen, etc. In some examples, a presence sensitive screen may detect an object at and/or near the presence-sensitive screen. As one example range, UID 12 may detect an object, such as a finger or stylus that is within 2 inches or less of the presence-sensitive screen. The presence-sensitive screen may determine a location (e.g., an (x,y) coordinate) of the presence-sensitive screen at which the object was detected. In another example range, a presence-sensitive screen may detect an object 6 inches or less from the presence-sensitive screen and other ranges are also possible. The presence-sensitive screen may determine the location of the screen selected by a user's finger using capacitive, inductive, and/or optical recognition techniques. In some examples, UID 12 provides output to a user using tactile, audio, or video stimuli as described with respect to output device 46. In the example of FIG. 2, UID 12 presents a user interface, such as user interface 14 of FIG. 1.

While illustrated as an internal component of computing device 10, UID 12 may also represent an external component that shares a data path with other components of computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 may be an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10. In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, keyboard module 22, gesture module 24, spatial model 26 and language module 28.

One or more processors 40 may implement functionality and/or execute instructions within computing device 10. For example, processors 40 on computing device 10 may receive and execute instructions stored by storage devices 48 that execute the functionality of UI module 20, keyboard module 22, gesture module 24, spatial model 26 and language module 28. These instructions executed by processors 40 may cause computing device 10 to store information, within storage devices 48 during program execution. Processors 40 may execute instructions of UI module 20, keyboard module 22, gesture module 24, spatial model 26 and language module 28 to cause UID 12 to display user interface 14. That is, modules UI module 20, keyboard module 22, gesture module 24, spatial model 26 and language module 28 may be operable by processors 40 to perform various actions, including receiving an indication of a gesture at locations of the presence-sensitive screen of UID 12 and causing presence-sensitive display 4 to present user interface 14 at UID 12.

In accordance with aspects of this disclosure keyboard module 22 may initially send data to UI module 20 that causes presence-sensitive display 4 to output a graphical keyboard for display. The graphical keyboard may include a plurality of keys. At least one of the plurality of keys is may be associated with one or more characters and/or symbols. In some examples, UI module 20 may, responsive to receiving an indication of a gesture detected at a presence-sensitive display, determine a selection of one or more of the plurality of keys. For instance, UI module 20 may receive an indication of a gesture from UID 12 and/or input device 42. In another example, UI module 20 may receive an indication of a gesture from communication unit 44, for example, if a presence-sensitive input device is separate from computing device 10 as further illustrated in FIG. 3.

Keyboard module 22 may determine a character string corresponding to the one or more of the plurality of keys in the selection. The character string is not included in a dictionary used by the computing device to identify character strings. For instance, keyboard module 22 may use spatial model 26 and/or language model 28 to determine a character string corresponding to the one or more plurality of keys in the selection as described in FIGS. 1 and 4. In accordance with techniques of the disclosure, keyboard module 22 may associate the character string with an out-of-vocabulary language model score, the out-of-vocabulary language model score.

In some examples, keyboard module 22 may determine, based at least in part on a spatial model score associated with the gesture and the out-of-vocabulary language model score, a combined score that indicates a probability that the character string corresponds to the gesture. In some examples, keyboard module 22 may generate the combined score based on the product and/or sum of the out-of-vocabulary language model score and/or spatial model score. Keyboard module 22 may output the character string for display at UID 12, input device 42, and/or communication unit 44. For instance, if the combined score associated with the character string satisfies a threshold (e.g., is greater than a threshold), keyboard module 22 may send data to UI module 20 that causes UID 12, input device 42, and/or communication unit 44 to output the character string.

As described in FIG. 1, keyboard module 22 may determine multiple character strings based on one or more gestures. Keyboard module 22 may select one or more of the multiple character strings for display. In some examples, one of the selected character strings may be an out-of-vocabulary character string, e.g., a character string that is not included in language model 28, that is displayed along with other character strings included in language model 28. For instance, keyboard module 22 may determine, by the computing device, a plurality of different character strings corresponding to the one or more of the plurality of keys in the selection. In some examples, each of the plurality of different character strings is included in a dictionary (e.g., which may include a vocabulary of words), such as a dictionary of character strings that are included in language model 28. For instance, keyboard module 22 may determine character strings "satin," "sarin," "satire" based on language model 28, which includes each of the character strings. Keyboard module 22 may also determine character string "satok," which may not be included in language model 28. In some examples, keyboard module 22 may determine character string "satok" based on one or more locations of UID 12 that correspond to the keys of graphical keyboard 16B associated with the "S" key, "A" key, "T" key, "O" key, and "K" key. For instance, the spatial model probabilities associated with each respective character of each key may be greater than a threshold.

Keyboard module 22 may determine a respective language model score for each different character string of the plurality of different character strings. For instance, as further illustrated in FIG. 4, keyboard module 22 may determine a language model score for each character string included in language model 28. In accordance with techniques of the disclosure, keyboard module 22 may determine that "satok" is not included in language model 28. Keyboard module 22 may associate an out-of-vocabulary language model score with the character string "satok." For instance, the out-of-vocabulary language model score may be equal to the lowest language model score in language model 28.

Keyboard module 22 may determine a respective combined score for each different character string of the plurality of character strings. The respective combined score may be based at least in part on the spatial model score and the respective language model score for the respective different character string of the plurality of character strings. For example, keyboard module 22 may determine a combined score for each of the plurality of character strings. A combined score for a character string of the plurality of character strings may be based on the spatial model score associated with the one of the character strings and the language model score (e.g., a language model based on language model 28 or an out-of-vocabulary language model score) associated with the character string.

In response to determining that the respective combined score for at least one of the different character strings of the plurality of character strings satisfies a threshold, keyboard module 22 may send data to UI module 20 that causes UI device 16 to output least one of the different strings with the out-of-vocabulary character string. For instance, as shown in FIG. 1, the character string "satin" may be associated with a combined score that satisfies the threshold. The character string "satin" may be outputted for display with the out-of-vocabulary character string "satok," which is not included in language model 28. In this way, if the user intended to enter the character string "satok", keyboard module 22 may output "satok" so that the user can provide user input to select "satok".

In some examples, a graphical user interface may include a limited amount of area to display character string suggestions. However, in some examples, the user may wish to see the out-of-vocabulary character string suggestion. In some examples, the user may wish to see the out-of-vocabulary character string even if one or more other character strings in a dictionary are associated with higher combined scores than a combined score associated with the out-of-vocabulary character string. In accordance with techniques of the disclosure, computing device 10 may output the out-of-vocabulary character string in a character string suggestion region.

In one example, UI module 20 may determine a plurality of character string suggestion regions in a graphical user interface that is output for display. For instance, UI module may determine character string suggestion regions 38A-38C of user interface 14. In response to receiving one or more indications of one or more gestures, keyboard module 22 may determine a plurality of different character strings corresponding to the one or more of the plurality of keys in the selection. In some examples, each different character string of the plurality of different character strings is included in the dictionary. Keyboard module 22 may determine a respective language model score for each different character string of the plurality of different character strings. For instance, keyboard module 22 may use language model 28 to determine the language model scores for the character strings.

Keyboard module 22, may determine a respective combined score for each different character string of the plurality of character strings. In some examples, the respective combined score may be based at least in part on a spatial model score and a respective language model score for the respective different character string of the plurality of character strings. As described in other examples of this disclosure, the combined score may be a sum or a product of the spatial and language model scores in some examples.

In some examples, keyboard module 22 may determine a quantity of probable character strings in the plurality of character strings. The probable character strings may be associated with combined scores that indicate higher probabilities than (e.g., probabilities greater than) a combined score of an out-of-vocabulary string. For instance a probable character string may be a character string included in a dictionary and may be associated with a combined score that is less than the combined score of an out-of-vocabulary character string.

Keyboard module 22, in response to determining that the quantity of probable character strings is greater than a quantity of character string suggestion regions in a plurality of character string suggestion regions, may send data to UI module 20 that causes UID 12 to output for display, the out-of-vocabulary character string in at least one of the plurality of character string suggestion regions. For example, keyboard module 22 may cause "satok," e.g., an out-of-vocabulary character string, to be displayed in character string suggestion region 38A. In some examples, keyboard module 22 may cause "satok" to be output for display in one of character string suggestion regions 38 although the combined score associated with "satok" is less than the combined scores of a quantity of character strings with combined scores greater than "satok", and where the quantity of character strings is greater than or equal to the quantity of character string suggestion regions. In this way, keyboard module 22 may cause "satok" to be outputted for display although other character strings with combined scores greater than "satok" would otherwise be displayed in character string suggestion regions 38.

Figure 3:
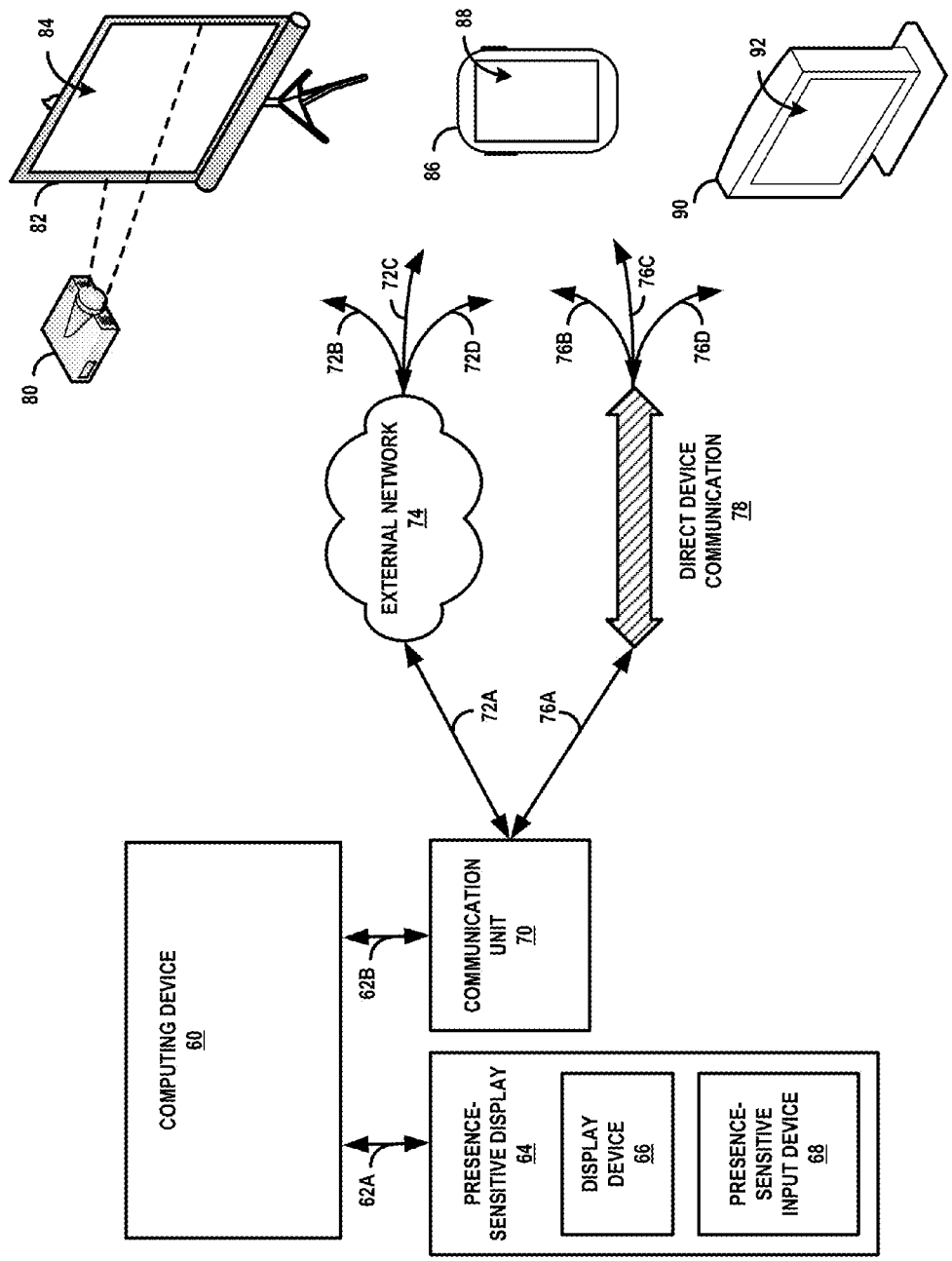
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 10, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processor 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 10 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 64, which may be a user-interface device such as UID 12 as shown in FIG. 1, may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UID 12 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all of the functionality of UID 12 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, WiFi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may be operatively coupled to visual display device 90 using external network 74. Computing device 60 may output a graphical keyboard for display at presence-sensitive display 92. For instance, computing device 60 may send data that includes a representation of the graphical keyboard to communication unit 70. Communication unit 70 may send the data that includes the representation of the graphical keyboard to visual display device 90 using external network 74. Visual display device 90, in response to receiving the data using external network 74, may cause presence-sensitive display 92 to output the graphical keyboard. In response to a user performing a gesture at presence-sensitive display 92 (e.g., at a region of presence-sensitive display 92 that outputs the graphical keyboard), visual display device 90 may send an indication of the gesture to computing device 60 using external network 74. Communication unit 70 of may receive the indication of the gesture, and send the indication to computing device 60.

In response to receiving an indication of at least one gesture detected at a presence-sensitive input device, computing device 60 may determine a selection of one or more of the plurality of keys. Computing device 60 may determine a character string corresponding to the one or more of the plurality of keys in the selection. The character string may not be included in a dictionary used by the computing device to identify character strings. In some examples computing device 60 may associate the character string with an out-of-vocabulary language model score. The out-of-vocabulary language model score may be associated with the character string is not included in the dictionary (e.g., which may include a vocabulary of words).

Computing device 60 may determine, based at least in part on a spatial model score associated with the gesture and the out-of-vocabulary language model score, a combined score that indicates a probability that the character string corresponds to the gesture. In some examples, if the combined score satisfies a threshold computing device 60 may output the character string for display. In one example, computing device 60 may output for display, the character string (e.g., an out-of-vocabulary character string). For instance, computing device 60 may send data representing the at the character string to communication unit 70. Communication unit 70 may send the data to visual display device 90 via external network 74. Visual display device 90 may cause presence-sensitive display 92 to output character string represented by the data.

Figure 4:
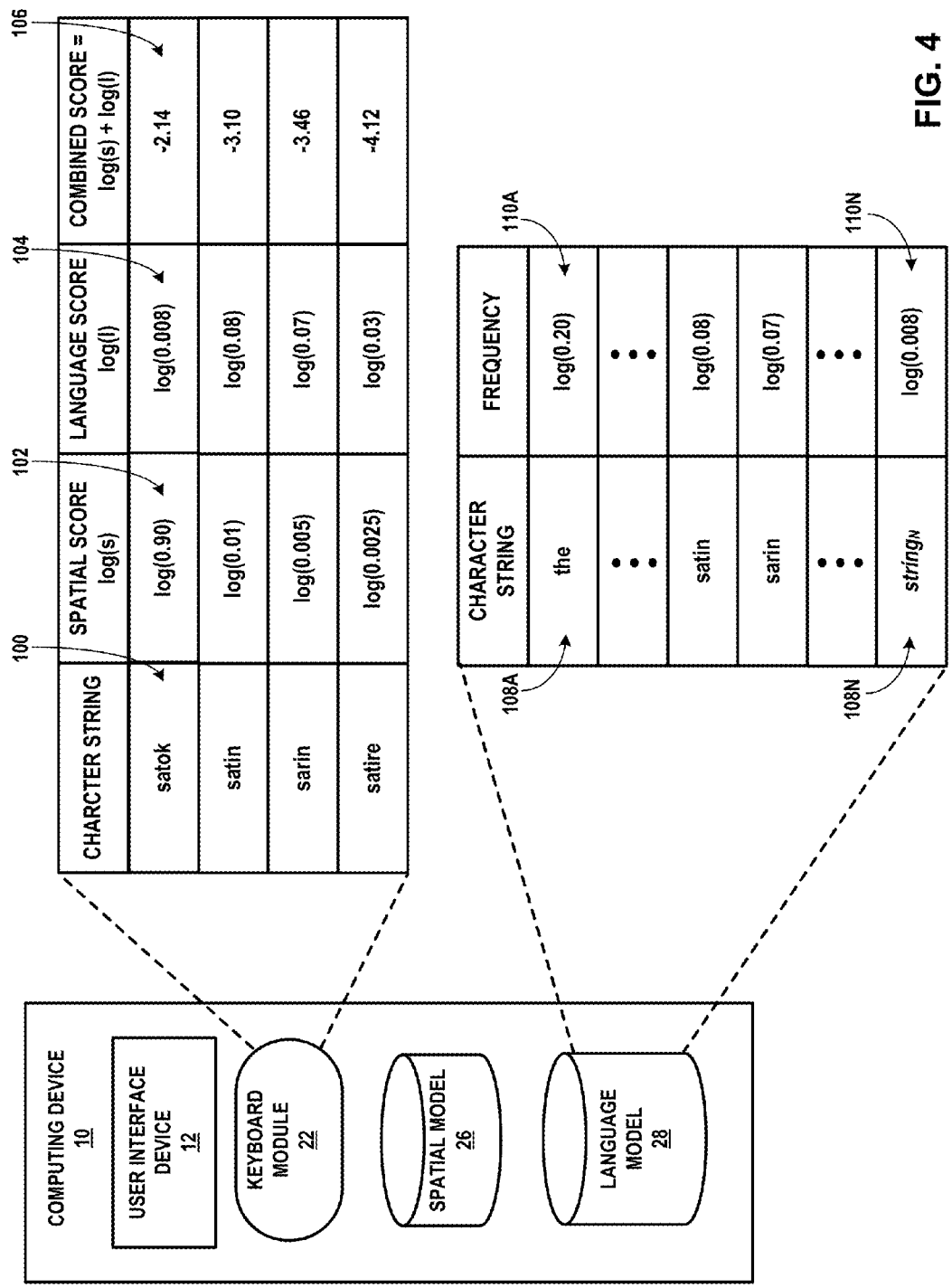
FIG. 4 is a conceptual diagram illustrating example data for determining out-of-vocabulary character strings, in accordance with one or more aspects of the present disclosure.

FIG. 4 is a conceptual diagram illustrating example data for determining out-of-vocabulary character strings, in accordance with one or more aspects of the present disclosure. FIG. 4 includes computing device 10 as previously described in, for example, FIGS. 1-2. Computing device 10 includes UID 12, keyboard module 22, spatial module 26, and language model 28 as previously described herein. Although character strings, spatial scores, language scores, and combined scores are shown in a table for ease of illustrating associations between the values in rows of in FIG. 4, one or more of the values may be stored in any suitable data structure and any number of suitable data structures. Alternatively, one or more of the values may be computed but not further stored at all in data structures. Although some values may be illustrated using logarithm values in FIG. 4, any suitable values representing probabilities and/or scoring may be used.

As shown in FIG. 4, keyboard module 22 may determine character strings such as "satok," "satin," "sarin," and "satire." Keyboard module 22 may determine character strings continuously in response to receiving indications of one or more gestures that are incrementally performed at an input device. For instance, in response to a user performing a continuous gesture at UID 12 that traverses locations of UID 12 that display graphical keys, keyboard module 22 may receive indications of the gesture at different locations of UID 12.

In some examples, computing device 10 may determine spatial model scores for one or more keys in response to receiving the indications of the gesture. For instance, in response to receiving one or more indications of gesture 30 corresponding to portion 34B (as shown in FIG. 1) keyboard module 22 may determine spatial model scores for the keys of graphical keyboard 16B that correspond to the 'A' key, the 'S' key, the 'W' key, and the 'Z' key. Keyboard module 22 may determine spatial model scores these respective keys because they may each be within a threshold distance of the location of portion 34B. For example, the indications of the gesture for portion 34B may include touch events that indication locations of UID 12 that correspond to the gesture path of gesture 30. Keyboard module 30 may determine that the distances from the locations corresponding to portion 34B to locations of 'A' key, the 'S' key, the 'W' key, and the 'Z' key are each less than the threshold distance.

As previously described in FIG. 1, keyboard module 30 may use one or more spatial models, e.g., spatial model 26, that correspond to one or more keys to determine a spatial model score for each key determined by keyboard module 30. In some examples, a character string may include multiple characters that correspond to different keys of graphical keyboard 16B. For instance, character string 100 ("satok"), may include the characters 's,' 'a,' 't,' 'o,' 'k,' that correspond respectively to keys of graphical keyboard 16B including an "S" key, "A" key, "T" key, "O" key, and "K" key. Spatial model score 102 for character string 100 may therefore be based on individual spatial model scores for each of the respective keys of graphical keyboard 16B. For instance, spatial model score 102 for character string 100 may be a product of the individual spatial model scores corresponding to each of the "S" key, "A" key, "T" key, "O" key, and "K" key that keyboard module 22 determined as the user performed the continuous gesture in proximity to these keys of graphical keyboard 16B.

As shown in FIG. 4, computing device 10 includes language model 28. As previously described in FIG. 1, language model 28 may indicate a probability of each respective character string based on the frequency with which the character string occurs in a given language context. For instance, the character string "the" may be more frequently used in than the character string "satin" in the current language context, which may include one or more characters, character strings, and/or phrases. Therefore, "the" may be associated with a larger probability than, for example, the character string "satin" in the language context.

In some examples, language model 28 may include a quantity of character strings that is equal to the number of words in a written vocabulary of a language. In other examples, language model 28 may include a quantity of character strings that is less than all possible words in a written vocabulary of a language. For instance, language model 28 may include character strings from a dictionary that includes fewer than all of the possible character strings of a written vocabulary. For example, a language may include 150,000 possible words, but a dictionary may include only 50,000 of the most commonly used words. Language model 28, in such an example, may include the 50,000 most commonly used words. Example character strings in FIG. 4 include character strings 108A-108N. Character string 108A ("the") may be a most probable character string and character string 108N ("string$_N$") may include a least probable character string.

As a user incrementally performs a gesture (e.g., one or more continuous and/or tap gestures), keyboard module 22 may incrementally perform a lookup of character strings in language model 28 that include a part of or all of the characters of a character string that comprise characters associated with keys that correspond to the gesture. For instance, as keyboard module 22 receives indications of a gesture that traverses from the "S" and "A" keys of graphical keyboard 16B to the "T key of graphical keyboard, keyboard module 22 may determine that the gesture path of gesture 30 traverses UID 12 in proximity to the "R" key and the "T" keys of graphical keyboard 16B. Keyboard module 22 may therefore determine character strings "SAT" and "SAR" among other possible character strings that include characters of keys in proximity to the gesture path of gesture 30.

To incrementally perform a lookup of character strings in language model 28, keyboard module 22 may model the character strings of language model 28 in a data structure that indicates the probability of a character string given a prefix, e.g., a group of one or more probable characters that correspond to keys in proximity to a gesture path of a gesture. For example, language model 28 may include a lexicon stored in a trie data structure. A lexicon trie data structure may contain a plurality of nodes, each node may represent a letter of a character string that is included in a dictionary. The first node in a lexicon trie may be called the entry node which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete character string (e.g., a word in a written vocabulary). The letters indicated by the nodes along a path of nodes from the entry node to a terminal node may spell out a character string indicated by the terminal node. For example, nodes in a path of nodes of the lexicon trie may correspond respectively to 's,' 'a,' 't,' 'i,' 'n', where the node corresponding to 'n' is a terminal node.

As show in FIG. 4, language model 28 may include language model frequency information such as n-gram language models. An n-gram language model may provide a probability distribution for an item $x_i$ (letter or word) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "t" follows the sequence "sa". In some examples, language model 28 includes the language model frequency information in the lexicon trie. For instance, each node of the lexicon trie may include a representation of a letter and a probability value that indicates the likelihood that the letter is the next letter following the prefix of characters corresponding to ancestor nodes in a path of the lexicon trie. As shown in FIG. 4, the respective probabilities nodes in the lexicon trie corresponding to 't,' 'h,', 'e,' may be based on frequency 110A. For instance, frequency 110A may indicate the probability of the character string "the" in a given language context. As one example, if the language context includes two previously inputted character strings, frequency 110 may represent the probability of "the" given the two previously inputted character strings. The probabilities included in each of the nodes corresponding to 't,' 'h,', 'e' may collectively be equal to frequency 110A. For instance, the product and/or sum of probabilities corresponding respectively to nodes for 't,' 'h,', 'e,' may be equal to frequency 110A.

To incrementally perform a lookup of character strings in language model 28 in response to one or more indications of a tap and/or continuous gesture, keyboard module 22 may determine one or more character strings based on example prefixes "SAR" and "SAT" by determining one or more paths of nodes the lexicon trie. A sequence of nodes in a path that ends in a terminal node may correspond to a character string in language model 26. Keyboard module 22 may determine one or more paths that include nodes corresponding to respective characters of a prefix. In one example, to output one or more suggested characters strings if a user has only partially completed a gesture (e.g., a prefix includes only "sat"), keyboard module 22 may determine that the node corresponding "t" of a path of nodes "s", "a", "t" is not a terminal node, keyboard module 22 may search for one or more paths from the node corresponding to "t" to terminal nodes. Each respective path may correspond to a different character string in language model that includes characters associated with nodes in the respective path. Keyboard module 22 may therefore select character strings using language model 26 by selecting paths with the highest language model scores, e.g., based on probabilities included in each respective node of a path that includes one or more nodes and corresponds to a selected character string.

As previously described in FIG. 1, keyboard module 22 may associate a combined score based on a language model score and a spatial model score with a character strings (e.g., a word from language model 28). Keyboard module 22 may select one or more character strings with the highest combined scores. Keyboard module 22 may output such character strings for display or otherwise select such character strings. In some examples, however, the user may wish to input a character string that is not included in language model 28. For instance, the out-of-vocabulary character string "satok" may not be included in language model 28. In other words, the lexicon tie of language model 28 may not include a path of nodes corresponding to "s," "a," "t," "o," "k." Rather than not outputting the intended character string "satok" because it is not included in language model 28, keyboard module 22 may associate the character string "satok" with an out-of-vocabulary language model score. The out-of-vocabulary language model score may be associated with the character string that is not included in the dictionary and may serve as a substitute score in the absence of a language model score that is based on language model 28. In this way, keyboard module 22 may determine a combined score based on an out-of-vocabulary language model score and a spatial model score, such that the combined score is associated with "satok." Keyboard module 22 may then compare the combined score of "satok" and if it is included in a group of character strings that have highest combined scores, keyboard module 22 may select "satok" (e.g., to output for display).

In some examples, the out-of-vocabulary language model score may be the lowest language model score associated with a character string in language model 28. For instance, keyboard module 22 may determine a plurality of character strings included in language model 28 (e.g., which includes character strings of a dictionary). As shown in FIG. 4, each character string of the plurality of character strings in language model 28 may be associated with a respective probability, such as frequency 110A, 110N, etc. Keyboard module 22 may determine a lowest probability included in the plurality of probabilities in language model 28. For instance, keyboard module 22 may determine that frequency 110N is the lowest probability, e.g., the smallest probability relative to the other probabilities associated with character strings, in language model 28. Keyboard module 22 may determine the out-of-vocabulary language model score based at least in part on the lowest probability. For example, keyboard module 22 may use the lowest probability associated with a character string in language model 28 as the out-of-vocabulary language model score. In other examples, keyboard module 22 may apply a weight to the lowest probability and use the weighted lowest probability as the out-of-vocabulary language model score. In any case, upon determining the out-of-vocabulary language model score, keyboard module 22 may determine a combined score based on the spatial model score associated with the character string and the out-of-vocabulary language model score.

In some examples, keyboard module 22 may use a pre-defined value as the out-of-vocabulary language model score. For example, keyboard module 22 may store and/or determine a predefined value that is configured by a user and/or engineer. The pre-defined value may be a constant value. For instance, the pre-defined value may be a non-zero value. In some examples, the pre-defined value may not be based on probabilities associated with character strings in language model 28. In still other examples, keyboard module 28 may apply a weight to the pre-defined value such that the weighted pre-defined value is used as the out-of-vocabulary language model score. In some examples, the weight may be based at least in part on the spatial model score of a character string to which keyboard module 22 associates the out-of-vocabulary language model score.

In some examples, keyboard module 28 may apply a penalty value to at least one of the combined score of the character string, the spatial model score, and the out-of-vocabulary language model score. For instance, keyboard module 28 may apply the penalty value in response to determining that the combined score is based at least in part on an out-of-vocabulary language model score. Keyboard module 28 may apply the penalty value because the out-of-vocabulary character string may have a very high combined score due to the high spatial model score associated with the keys corresponding to the characters included in the character string. In some examples, the penalty value may be a constant value. The penalty value may be configured by a user and/or engineer. In some examples, applying a weight to a value (e.g., a penalty value, pre-defined value, score, etc.) may include adding or multiplying the value and the weight.

In some examples, keyboard module 28 may associate an out-of-vocabulary language model score with a character string in response to determining that the spatial model score associated with the character string satisfies a threshold. In some examples, the spatial model score may satisfy the threshold when the score is greater than the threshold. In other examples, the spatial model score may satisfy the threshold when the score is less than the threshold. Therefore, in some examples, keyboard module 28 may not associate an out-of-vocabulary language model score with a character string that has a spatial model score that does not satisfy the threshold. Consequently, in some examples, keyboard module 28 may associate the out-of-vocabulary language model score with a character string only if the spatial model score associated with the character string satisfies a threshold.

Figure 5:
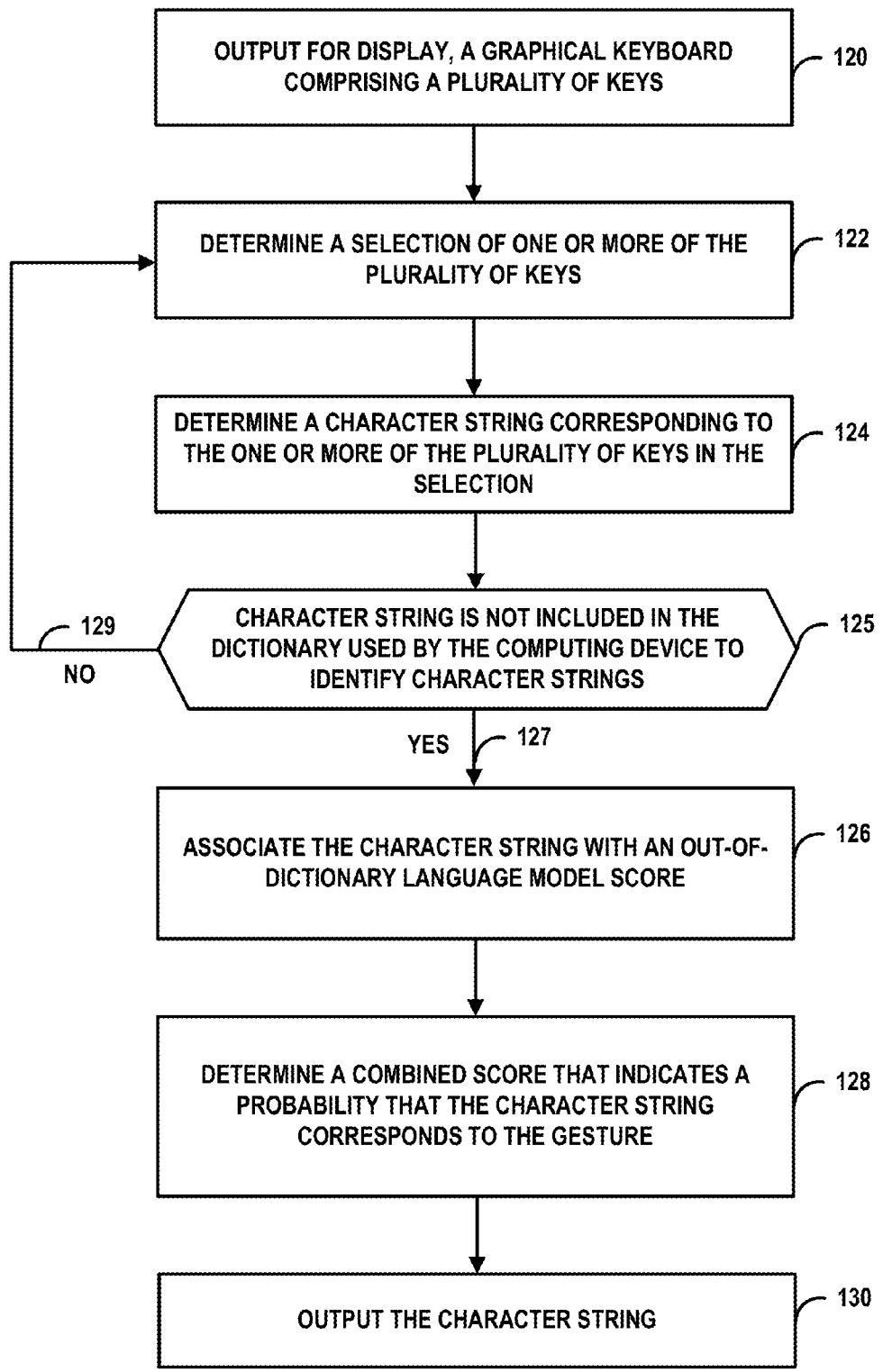
FIG. 5 is a flowchart illustrating example operations of a computing device configured to determine an out-of-vocabulary character string with a gesture keyboard, in accordance with one or more aspects of the present disclosure.

FIG. 5 is a flowchart illustrating example operations of a computing device configured to determine an out-of-vocabulary character string with a gesture keyboard, in accordance with one or more aspects of the present disclosure. For purposes of illustration, the example operations are described below within the context of computing device 10, as shown in FIGS. 1 and 2.

Computing device 10 may initially output for display, a graphical keyboard comprising a plurality of keys (120). For instance, as shown in FIG. 1, computing device 10 may output graphical keyboard 16B in user interface 14. Responsive to receiving an indication of a gesture detected at a presence-sensitive display, such as UID 12, computing device 10 may determine a selection of one or more of the plurality of keys (122). For instance, computing device 10 may use one or more spatial models, such as spatial model 26 to determine a selection of one or more of the plurality of keys.

Computing device 10 may determine a character string corresponding to the one or more of the plurality of keys in the selection (124). In some examples, the character string may not be included in a dictionary (e.g., which may include a vocabulary of words) used by the computing device to identify character strings (127). For instance, the character string may be a prefix comprising a sequence of one or more characters that do not correspond to a prefix of a character string in a dictionary. In other examples, the character string may be included in the dictionary (129). In some examples, in response to determining that the character string is not included in the dictionary used by the computing device to identify character strings, computing device 10 may associate the character string with an out-of-vocabulary language model score (126). In some examples, the out-of-vocabulary language model score may be associated with the character string that is not included in the vocabulary.

In some examples, computing device 10 may determine, based at least in part on a spatial model score associated with the gesture and the out-of-vocabulary language model score, a combined score that indicates a probability that the character string corresponds to the gesture (128). Computing device 10 may output the character string for display (128). For instance, in some examples, computing device 10 may determine that the combined score satisfies a threshold. Computing device 10 may output the display in user interface 14. For example, computing device 10 may output the character string for display in one of regions 16 of user interface 14.

In some examples, the operations may include determining, by the computing device, for each respective character string from a plurality of character strings included in the vocabulary, a respective probability associated with the respective character string from a plurality of probabilities; determining, by the computing device, a lowest probability included in the plurality of probabilities; and using, by the computing device, the lowest probability as the out-of-vocabulary language model score; determining, by the computing device, a lowest probability included in the plurality of probabilities; and using, by the computing device, the lowest probability as the out-of-vocabulary language model score. In some examples, the operations may include in response to determining that the character string is not included in the vocabulary used by the computing device to identify character strings, selecting, by the computing device, a predefined value as the out-of-vocabulary language model score.

In some examples, the operations may include determining, by the computing device, a plurality of different character strings corresponding to the one or more of the plurality of keys in the selection, wherein each of the plurality of different character strings is included in the vocabulary; determining, by the computing device, a respective language model score for each different character string of the plurality of different character strings; determining, by the computing device, a respective combined score for each different character string of the plurality of character strings, the respective combined score based at least in part on the spatial model score and the respective language model score for the respective different character string of the plurality of character strings; and in response to determining that the respective combined score for at least one of the different character strings of the plurality of character strings satisfies a threshold, outputting, by the computing device and for display, the at least one of the different strings with the out-of-vocabulary character string.

In some examples, the operations may include determining, by the computing device, a plurality of character string suggestion regions in a graphical user interface that is output for display by the computing device; determining, by the computing device, a plurality of different character strings corresponding to the one or more of the plurality of keys in the selection, wherein each different character string of the plurality of different character strings is included in the vocabulary; determining, by the computing device, a respective language model score for each different character string of the plurality of different character strings; determining, by the computing device, a respective combined score for each different character string of the plurality of character strings, the respective combined score based at least in part on the spatial model score and the respective language model score for the respective different character string of the plurality of character strings; determining, by the computing device, a quantity of probable character strings in the plurality of character strings, wherein the probable character strings are associated with combined scores that indicate higher probabilities than the combined score of the out-of-vocabulary character string; in response to determining that the quantity of probable character strings is greater than a quantity of character string suggestion regions in the plurality of character string suggestion regions, outputting, by the computing device and for display, the out-of-vocabulary character string in at least one of the plurality of character string suggestion regions.

In some examples, the operations may include determining, by the computing device, a penalty value; and applying, by the computing device, the penalty value to at least one of the combined score of the character string, the a spatial model score, and the out-of-vocabulary language model score. In some examples, the operations may include, while receiving a plurality of indications of one or more gestures detected at a presence-sensitive screen, updating, by the computing device, the out-of-vocabulary language model score based on a language context, wherein the language context changes in response to at least one the plurality of indications of one or more gestures. In some examples, the gesture may be a continuous gesture that traverses a plurality of locations of the presence-sensitive screen that correspond respectively to a plurality of keys of the graphical keyboard.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Various examples have been described. These and other examples are within the scope of the following claims.

What is claimed is:

1. A method comprising:
    outputting, by a computing device and for display, a graphical keyboard comprising a plurality of keys;
    responsive to receiving an indication of a gesture detected at a presence-sensitive input device, determining, by the computing device, a selection of one or more of the plurality of keys;
    determining, by the computing device, a character string based on the one or more of the plurality of keys of the selection, wherein the character string is not included in a vocabulary used by the computing device to identify character strings;
    responsive to determining that the character string is not included in the vocabulary used by the computing device to identify character strings, associating, by the computing device, the character string with an out-of-vocabulary language model score, the out-of-vocabulary language model score being a substitute score that is determined without application of a language model to the character string;
    determining, by the computing device and based at least in part on a spatial model score associated with the gesture and the out-of-vocabulary language model score, a combined score that indicates a probability that the character string corresponds to the gesture; and
    outputting, by the computing device and for display, the character string.

2. The method of claim 1, wherein associating the character string with the out-of-vocabulary language model score further comprises:
    determining, by the computing device, for each respective character string from a plurality of character strings included in the vocabulary, a respective probability associated with the respective character string from a plurality of probabilities;

29 determining, by the computing device, a lowest probability included in the plurality of probabilities; and using, by the computing device, the lowest probability as the out-of-vocabulary language model score.

3. The method of claim 1, wherein associating the character string with the out-of-vocabulary language model score further comprises:

in response to determining that the character string is not included in the vocabulary used by the computing device to identify character strings, selecting, by the computing device, a predefined value as the out-of-vocabulary language model score.

4. The method of claim 1, wherein the character string is an out-of-vocabulary character string, the method further comprising:

determining, by the computing device, a plurality of different character strings corresponding to the one or more of the plurality of keys in the selection, wherein each of the plurality of different character strings is included in the vocabulary;

determining, by the computing device, a respective language model score for each different character string of the plurality of different character strings;

determining, by the computing device, a respective combined score for each different character string of the plurality of character strings, the respective combined score based at least in part on the spatial model score and the respective language model score for the respective different character string of the plurality of character strings; and in response to determining that the respective combined score for at least one of the different character strings of the plurality of character strings satisfies a threshold, outputting, by the computing device and for display, the at least one of the different strings with the out-of-vocabulary character string.

5. The method of claim 1, wherein the character string is an out-of-vocabulary character string, further comprising:

determining, by the computing device, a plurality of character string suggestion regions in a graphical user interface that is output for display by the computing device;

determining, by the computing device, a plurality of different character strings corresponding to the one or more of the plurality of keys in the selection, wherein each different character string of the plurality of different character strings is included in the vocabulary;

determining, by the computing device, a respective language model score for each different character string of the plurality of different character strings;

determining, by the computing device, a respective combined score for each different character string of the plurality of character strings, the respective combined score based at least in part on the spatial model score and the respective language model score for the respective different character string of the plurality of character strings;

determining, by the computing device, a quantity of probable character strings in the plurality of character strings, wherein the probable character strings are associated with combined scores that indicate higher probabilities than the combined score of the out-of-vocabulary character string;

in response to determining that the quantity of probable character strings is greater than a quantity of character string suggestion regions in the plurality of character string suggestion regions, outputting, by the computing device and for display, the out-of-vocabulary character string in at least one of the plurality of character string suggestion regions.

6. The method of claim 1, further comprising:

determining, by the computing device, a penalty value; and applying, by the computing device, the penalty value to at least one of the combined score of the character string, the a spatial model score, and the out-of-vocabulary language model score.

7. The method of claim 1, further comprising:

while receiving a plurality of indications of one or more gestures detected at a presence-sensitive screen, updating, by the computing device, the out-of-vocabulary language model score based on a language context, wherein the language context changes in response to at least one the plurality of indications of one or more gestures.

8. The method of claim 1, wherein the gesture further comprises a continuous gesture that traverses a plurality of locations of the presence-sensitive screen that correspond respectively to a plurality of keys of the graphical keyboard.

9. A computer-readable storage medium encoded with instructions that, when executed, cause at least one processor to:

output for display, a graphical keyboard comprising a plurality of keys;

responsive to receiving an indication of a gesture detected at a presence-sensitive input device, determine a selection of one or more of the plurality of keys;

determine a character string based on the one or more of the plurality of keys in the selection, wherein the character string is not included in a vocabulary used by the computing device to identify character strings;

responsive to determining that the character string is not included in the vocabulary used by the computing device to identify character strings, associate the character string with an out-of-vocabulary language model score, the out-of-vocabulary language model score being a substitute score that is determined without application of a language model to the character string;

determine, based at least in part on a spatial model score associated with the gesture and the out-of-vocabulary language model score, a combined score that indicates a probability that the character string corresponds to the gesture; and output for display the character string.

10. The computer-readable storage medium of claim 9, encoded with instructions that, when executed, cause at least one processor to:

determine a plurality of character strings included in the vocabulary, wherein each character string of the plurality of character strings is associated with a respective probability of a plurality of probabilities;

determine a lowest probability included in the plurality of probabilities; and use the lowest probability as the out-of-vocabulary language model score.

11. The computer-readable storage medium of claim 9, encoded with instructions that, when executed, cause at least one processor to:

in response to determining that the character string is not included in the vocabulary used by the computing device to identify character strings, select a predefined value as the out-of-vocabulary language model score.

12. The computer-readable storage medium of claim 9, wherein the character string is an out-of-vocabulary character string, the computer-readable storage medium encoded with instructions that, when executed, cause at least one processor to:
- determine a plurality of different character strings corresponding to the one or more of the plurality of keys in the selection, wherein each of the plurality of different character strings is included in the vocabulary;
- determine a respective language model score for each different character string of the plurality of different character strings;
- determine a respective combined score for each different character string of the plurality of character strings, the respective combined score based at least in part on the spatial model score and the respective language model score for the respective different character string of the plurality of character strings; and
- in response to determining that the respective combined score for at least one of the different character strings of the plurality of character strings satisfies a threshold, output for display, the at least one of the different strings with the out-of-vocabulary character string.

13. The computer-readable storage medium of claim 9, wherein the character string is an out-of-vocabulary character string, the computer-readable storage medium encoded with instructions that, when executed, cause at least one processor to:
- determine a plurality of character string suggestion regions in a graphical user interface that is output for display by the computing device;
- determine a plurality of different character strings corresponding to the one or more of the plurality of keys in the selection, wherein each different character string of the plurality of different character strings is included in the vocabulary;
- determine a respective language model score for each different character string of the plurality of different character strings;
- determine a respective combined score for each different character string of the plurality of character strings, the respective combined score based at least in part on the spatial model score and the respective language model score for the respective different character string of the plurality of character strings;
- determine a quantity of probable character strings in the plurality of character strings, wherein the probable character strings are associated with combined scores that indicate higher probabilities than the combined score of the out-of-vocabulary character string;
- in response to determining that the quantity of probable character strings is greater than a quantity of character string suggestion regions in the plurality of character string suggestion regions, output for display, the out-of-vocabulary character string in at least one of the plurality of character string suggestion regions.

14. The computer-readable storage medium of claim 9, encoded with instructions that, when executed, cause at least one processor to:
- determine a penalty value; and
- apply the penalty value to at least one of the combined score of the character string, the a spatial model score, and the out-of-vocabulary language model score.

15. The computer-readable storage medium of claim 9, encoded with instructions that, when executed, cause at least one processor to:
- while receiving a plurality of indications of one or more gestures detected at a presence-sensitive screen, update the out-of-vocabulary language model score based on a language context, wherein the language context changes in response to at least one the plurality of indications of one or more gestures.

16. The computer-readable storage medium of claim 9, wherein the gesture further comprises a continuous gesture that traverses a plurality of locations of the presence-sensitive screen that correspond respectively to a plurality of keys of the graphical keyboard.

17. A computing device comprising at least one processor, wherein the at least one processor is configured to:
- output for display, a graphical keyboard comprising a plurality of keys;
- responsive to receiving an indication of a gesture detected at a presence-sensitive input device, determine a selection of one or more of the plurality of keys;
- determine a character string based on the one or more of the plurality of keys in the selection, wherein the character string is not included in a vocabulary used by the computing device to identify character strings;
- responsive to determining that the character string is not included in the vocabulary used by the computing device to identify character strings, associate the character string with an out-of-vocabulary language model score, the out-of-vocabulary language model score being a substitute score that is determined without application of a language model to the character string;
- determine, based at least in part on a spatial model score associated with the gesture and the out-of-vocabulary language model score, a combined score that indicates a probability that the character string corresponds to the gesture; and
- output for display the character string.

18. The computing device of claim 17, wherein the at least one processor is configured to:
- determine a plurality of character strings included in the vocabulary, wherein each character string of the plurality of character strings is associated with a respective probability of a plurality of probabilities;
- determine a lowest probability included in the plurality of probabilities; and
- use the lowest probability as the out-of-vocabulary language model score.

19. The computing device of claim 17, wherein the at least one processor is configured to:
- in response to determining that the character string is not included in the vocabulary used by the computing device to identify character strings, select a predefined value as the out-of-vocabulary language model score.

20. The computing device of claim 17, wherein the character string is an out-of-vocabulary character string, wherein the at least one processor is configured to:
- determine a plurality of different character strings corresponding to the one or more of the plurality of keys in the selection, wherein each of the plurality of different character strings is included in the vocabulary;
- determine a respective language model score for each different character string of the plurality of different character strings;
- determine a respective combined score for each different character string of the plurality of character strings, the respective combined score based at least in part on the spatial model score and the respective language model score for the respective different character string of the plurality of character strings; and
- in response to determining that the respective combined score for at least one of the different character strings of the plurality of character strings satisfies a threshold, output for display, the at least one of the different strings with the out-of-vocabulary character string.

21. The computing device of claim 17, wherein the character string is an out-of-vocabulary character string, wherein the at least one processor is configured to:
- determine a plurality of character string suggestion regions in a graphical user interface that is output for display by the computing device;
- determine a plurality of different character strings corresponding to the one or more of the plurality of keys in the selection, wherein each different character string of the plurality of different character strings is included in the vocabulary;
- determine a respective language model score for each different character string of the plurality of different character strings;
- determine a respective combined score for each different character string of the plurality of character strings, the respective combined score based at least in part on the spatial model score and the respective language model score for the respective different character string of the plurality of character strings;
- determine a quantity of probable character strings in the plurality of character strings, wherein the probable character strings are associated with combined scores that indicate higher probabilities than the combined score of the out-of-vocabulary character string;
- in response to determining that the quantity of probable character strings is greater than a quantity of character string suggestion regions in the plurality of character string suggestion regions, output for display, the out-of-vocabulary character string in at least one of the plurality of character string suggestion regions.

22. The computing device of claim 17, wherein the at least one processor is configured to:
- determine a penalty value; and
- applying the penalty value to at least one of the combined score of the character string, the a spatial model score, and the out-of-vocabulary language model score.

23. The computing device of claim 17, wherein the at least one processor is configured to:
- while receiving a plurality of indications of one or more gestures detected at a presence-sensitive screen, update the out-of-vocabulary language model score based on a language context, wherein the language context changes in response to at least one the plurality of indications of one or more gestures.

24. The computing device of claim 17, wherein the gesture further comprises a continuous gesture that traverses a plurality of locations of the presence-sensitive screen that correspond respectively to a plurality of keys of the graphical keyboard.

* * * * *